United States Patent
Jabara et al.

(10) Patent No.: US 8,295,803 B2
(45) Date of Patent: Oct. 23, 2012

(54) SYSTEM AND METHOD FOR DIRECT COMMUNICATION BETWEEN WIRELESS COMMUNICATION DEVICES

(75) Inventors: Gary B. Jabara, Irvine, CA (US); Christos Karmis, Irvine, CA (US)

(73) Assignee: E3, LLC, Newport Beach, CA (US)

( * ) Notice: Subject to any disclaimer, the term of this patent is extended or adjusted under 35 U.S.C. 154(b) by 0 days.

(21) Appl. No.: 13/163,416

(22) Filed: Jun. 17, 2011

(65) Prior Publication Data

US 2011/0246611 A1   Oct. 6, 2011

Related U.S. Application Data

(62) Division of application No. 12/616,958, filed on Nov. 12, 2009.

(51) Int. Cl.
*H04M 11/04* (2006.01)

(52) U.S. Cl. ............... 455/404.2; 455/414.2; 455/456.1; 370/338

(58) Field of Classification Search ............... 455/404.2, 455/414.2, 456.1, 457, 432.3, 41.2; 379/142.06; 370/338

See application file for complete search history.

(56) References Cited

U.S. PATENT DOCUMENTS

| | | | | |
|---|---|---|---|---|
| 5,974,398 | A * | 10/1999 | Hanson et al. | 705/14.64 |
| 7,072,888 | B1 * | 7/2006 | Perkins | 707/733 |
| 7,213,057 | B2 * | 5/2007 | Trethewey | 709/218 |
| 7,254,406 | B2 * | 8/2007 | Beros et al. | 455/456.3 |
| 7,389,122 | B2 * | 6/2008 | Chin | 455/525 |
| 7,478,424 | B2 * | 1/2009 | Mester et al. | 726/11 |
| 7,516,222 | B2 * | 4/2009 | Vitikka | 709/227 |
| 7,584,136 | B2 * | 9/2009 | Shuler et al. | 705/37 |
| 7,599,851 | B2 * | 10/2009 | Frengut et al. | 705/14.26 |
| 7,680,770 | B1 * | 3/2010 | Buyukkokten et al. | 707/758 |
| 7,805,531 | B2 * | 9/2010 | Groll et al. | 709/229 |
| 7,941,834 | B2 * | 5/2011 | Beck et al. | 726/6 |
| 2002/0046099 | A1 * | 4/2002 | Frengut et al. | 705/14 |
| 2002/0083167 | A1 * | 6/2002 | Costigan et al. | 709/224 |
| 2004/0046656 | A1 * | 3/2004 | Schaefer et al. | 340/539.11 |
| 2004/0048605 | A1 * | 3/2004 | Schaefer et al. | 455/414.2 |
| 2005/0221844 | A1 * | 10/2005 | Trethewey et al. | 455/456.6 |
| 2006/0080127 | A1 * | 4/2006 | Barry | 705/1 |
| 2007/0179863 | A1 * | 8/2007 | Stoll | 705/26 |
| 2008/0056215 | A1 * | 3/2008 | Kopikare et al. | 370/338 |
| 2008/0222127 | A1 * | 9/2008 | Bergin | 707/5 |
| 2009/0055857 | A1 * | 2/2009 | Gatz | 725/32 |
| 2009/0128502 | A1 * | 5/2009 | Li et al. | 345/173 |
| 2010/0107225 | A1 * | 4/2010 | Spencer et al. | 726/4 |
| 2010/0169262 | A1 * | 7/2010 | Kenedy et al. | 706/50 |
| 2010/0169340 | A1 * | 7/2010 | Kenedy et al. | 707/758 |
| 2010/0293052 | A1 * | 11/2010 | DiOrio et al. | 705/14.53 |
| 2011/0246611 | A1 * | 10/2011 | Jabara et al. | 709/217 |

\* cited by examiner

*Primary Examiner* — Minh D Dao

(74) *Attorney, Agent, or Firm* — Michael J. Donohue; Davis Wright Tremaine LLP

(57) ABSTRACT

A wireless communication device includes conventional components to permit a network communication link to be established with a wireless communication network. In addition, the wireless communication device includes a non-network transceiver that detects the presence of a wireless access point. When two such equipped devices come within proximity of the access point, a non-network wireless communication link is established. The two devices exchange portions of profile data which is analyzed to determine if a match exists. If a match occurs, a contact notification is generated. This permits the wireless communication device to act as an auto-detecting social network device that detects the proximity of other devices whose owners have a profile that matches the stored user preference data. Subsequent communication may occur in a conventional manner using the wireless network communication channels and web applications may also be used to gain additional information.

33 Claims, 8 Drawing Sheets

| JUMP OUT PREFERENCE DATA |
|---|
| ○ SEX |
| ○ AGE |
| ○ HEIGHT          NO PREFERENCE |
| ○ WEIGHT          NO PREFERENCE |
| ○ STATUS |
| ○ WORK/AFFILIATION |
| ○ HOBBIES/INTERESTS   NO PREFERENCE |

184

192

| JUMP IN PERSONAL DATA |
|---|
| ○ NAME |
| ○ SEX |
| ○ AGE |
| ○ HEIGHT |
| ○ WEIGHT |
| ○ STATUS |
| ○ WORK/AFFILIATION |
| ○ HOBBIES/INTERESTS |
| ○ EMAIL ADDRESS |
| ○ JUMP WEB PAGE LINK |
| ○ MOBILE NUMBER |

SYSTEM AND METHOD FOR DIRECT COMMUNICATION BETWEEN WIRELESS COMMUNICATION DEVICES

RELATED APPLICATIONS

This application is a divisional U.S. application Ser. No. 12/616,958 filed on Nov. 12, 2009, the entire disclosure and content of which are hereby incorporated by reference.

BACKGROUND OF THE INVENTION

1. Field of the Invention

The present invention is directed generally to wireless communication devices and, more particularly, to a system and method that allows direct communication between wireless communication devices.

2. Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, more modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members is also relayed via one or more base stations as part of the wireless network.

Therefore, it can be appreciated that there is a need for wireless communication devices that can communicate with the communication network via base stations, but may also communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

FIG. 3 illustrates an example of profile storage in the wireless communication device of FIG. 2.

DETAILED DESCRIPTION OF THE INVENTION

Figure 1:
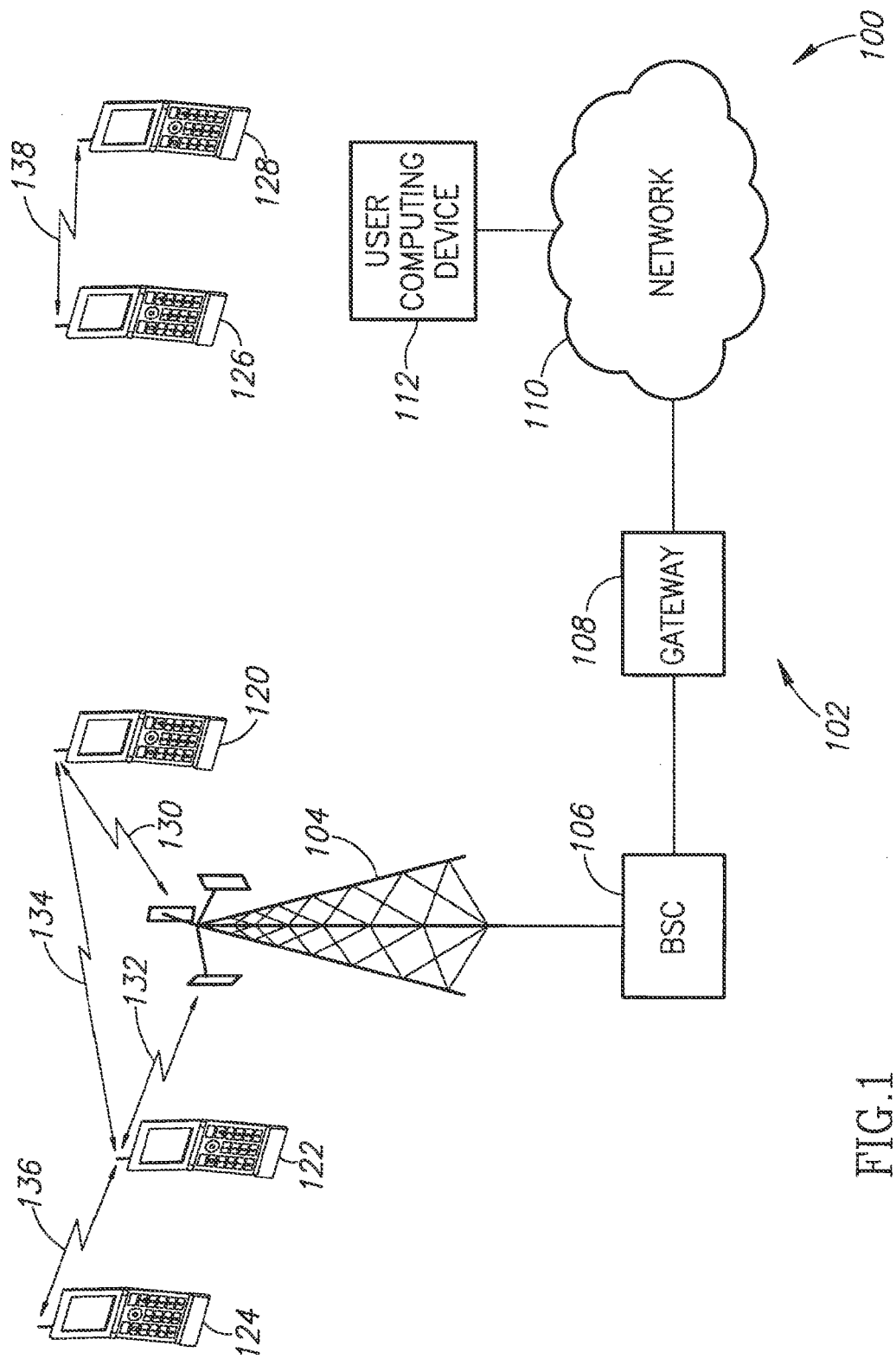
FIG. 1 is a diagram illustrating a system architecture configured to implement a communication system in accordance with the present teachings.

The system described herein extends the normal operational features of conventional wireless communication devices. As described above, the conventional wireless communication device communicates with a wireless communication network via a base station. The extended capabilities described herein provide a second transceiver device that allows wireless communication devices to communicate directly with each other over a short-range. The wireless communication devices are illustrated as part of a system 100 illustrated in the system architecture in FIG. 1. Portions of the system 100 are conventional network components that will be described briefly herein. The non-network communication capability, which may be referred to herein as a "jump-enabled" device or a "jump" device, will be described in greater detail below.

A conventional wireless communication network 102 includes a base station 104. Those skilled in the art will appreciate that the typical wireless communication network 102 will include a large number of base stations 104. However, for the sake of brevity and clarity and understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104. Those skilled in the art will appreciate that the wireless communication network 102 may communicate using a variety of different signaling protocols. For example, the system 100 may be successfully implemented using, by way of example, CDMA, WCDMA, GSM, UMTS, and the like. The system 100 is not limited by any specific operational mode for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the wireless communication network 102 via the base station 104. Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a second short-range transceiver to allow direct communication between the devices. This short-range communication is accomplished via non-network communication links. For example, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a non-network communication link 134.

As illustrated in FIG. 1, the wireless communication device 124 is not in communication with the wireless communication network 102. However, the wireless communication device 124 can communicate directly with the wireless communication device 122 via a non-network wireless communication link 136. Also illustrated in FIG. 1 are the wireless communication devices 126-128. Although neither of these devices (i.e., the wireless communication devices 126-128) are in communication with the wireless communication network 102, the two devices is in direct communication with each other via a non-network wireless communication link 138. Thus, jump-enabled wireless communication devices must be in proximity with each other, but need not be in communication with the wireless communication network or even in an area of wireless coverage provided by the wireless communication network 102.

Figure 2:
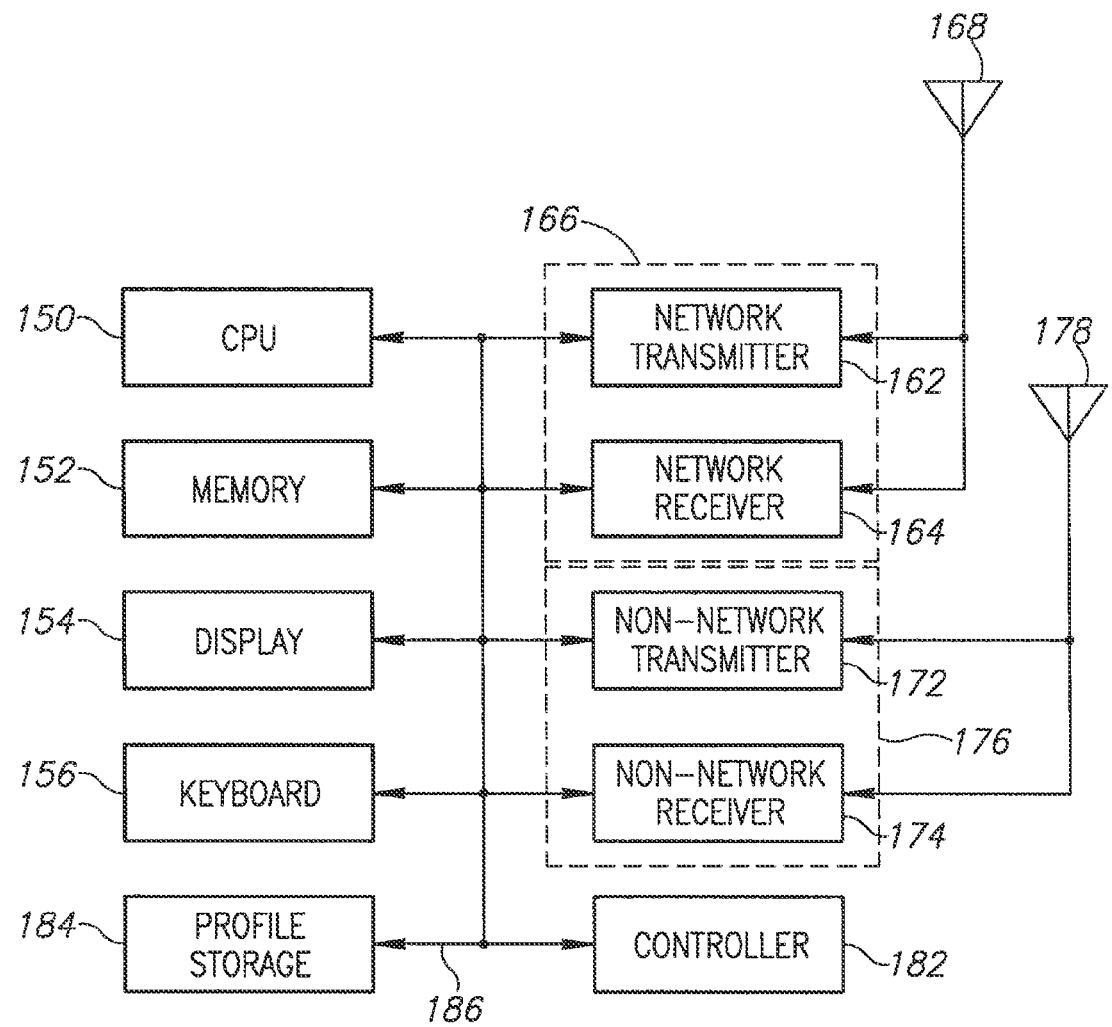
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. The memory 152 may store instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for normal network wireless communication with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 are implemented as a network transceiver 166. The network transceiver 166 is connected to an antenna 168. Operation of the network transceiver 166 and the antenna 168 for communication with the wireless network 102 is well-known in the art and need not be described in greater detail herein.

The wireless communication device 120 of FIG. 2 also includes a non-network transmitter 172 that is used by the wireless communication device 120 for direct communication with other jump-enabled wireless communication devices (e.g., the wireless communication device 122 of FIG. 1). FIG. 2 also illustrates a non-network receiver 174 that operates in conjunction with the non-network transmitter 172 to communicate directly with other jump-enabled wireless (e.g., the wireless communication device 122 of FIG. 1). In a typical embodiment, the non-network transmitter 172 and non-network receiver 174 are implemented as a non-network transceiver 176. The non-network transceiver 176 is connected to an antenna 178. In an exemplary embodiment, the antennas 168 and 178 may have common components are implemented as a single antenna.

In an exemplary embodiment, the non-network transceiver 176 may be designed for operation in accordance with IEEE standard 802.11. In one embodiment, a jump-enabled wireless communication device operates in an "ad hoc" mode defined by IEEE 802.11, which allows devices to operate in an independent basic service set (IBSS) network configuration. In this manner, jump-enabled wireless communication devices (e.g., the wireless communication devices 120-128) communicate directly with each other in a peer-to-peer manner using unlicensed frequency bands. Low power operation limits the range of communication to approximately 100 feet. Although the operational range of jump-enabled devices can be more or less than 100 feet, jump-enabled wireless communication devices are designed for short range communication capability.

All jump-enabled wireless communication devices use the same service set identifier (SSID) and the same physical radio channel (PHY) to permit each jump-enabled wireless communication devices to detect and identify other jump-enabled wireless communication devices. In addition, since there is no access point, all jump-enabled wireless communication devices take on the responsibilities of the medium access layer (MAC) that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the physical layer (PHY), the transceiver may operate in a direct frequency spread spectrum (DSSS) or a frequency hopping spread spectrum (FHSS)

operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) or under IEEE 802.11b/g at 2.4 GHz.

In operation, the first active jump-enabled device (e.g., the wireless communication device 120) establishes an IBBS and starts sending beacon signals at approximately 10 per second. The beacon signals are used to maintain synchronization among the various jump-enabled devices. Other ad hoc jump-enabled wireless communication devices (e.g., the wireless communication device 122 of FIG. 1) can join the network after receiving the beacon signal and accepting the IBSS parameters. After receiving a beacon signal, each station updates their local internal clock with the time stamp found in the beacon frame. This ensures that all stations are able to perform operations, such as beacon transmission and power management functions, at the same time. Operation of devices under IEEE 802.11 is generally known in the art, and need not be described in greater detail herein. Once a non-network wireless communication link (e.g., the non-network wireless communication link 134 between the wireless communication devices 120 and 122 in FIG. 1) is established, profile data stored in the two wireless communication devices will be analyzed. In an exemplary embodiment, a controller 182 transmits a portion of data stored in a profile storage 184 to any jump-enabled device with which it can establish a non-network wireless communication link. In addition, the controller 182 may receive portions of data from the corresponding profile storage 184 in the wireless communication device with which the non-network communication link has been established. Details of the profile analysis are provided below.

Those skilled in the art will recognize that the controller 182 may be implemented as a series of computer instructions stored in the memory 152 and executed by the CPU 150. However, the controller 182 is shown as a separate block in the functional block diagram of FIG. 2 because it performs a separate function.

The profile storage 184 may be implemented as any convenient data structure, whether in the form of a data table, database, spreadsheet, or the like. In an exemplary embodiment, the profile storage 184 may be implemented as part of the memory 152, but is shown in the functional block diagram of FIG. 2 because it performs a separate function in the wireless communication device 120.

In one embodiment, the profile storage 184 may be implemented on a removable memory card to make it easily transferable to another jump-enabled wireless communication device. Some conventional wireless communication devices utilize a removable Subscriber Identity Module (SIM) card that is easily installed and removed thus making it easy for the consumer to switch phones. In a similar fashion, the profile storage 184 could be implemented as part of a SIM card or similar device.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

When the jump-enabled wireless communication device 120 comes within range of any other jump-enabled wireless communication device (e.g., the wireless communication device 122 of FIG. 1), it establishes a non-network wireless communication link (e.g., the non-network wireless communication link 134). However, the users of the jump-enabled wireless communication devices 120-122 may not be immediately notified of the detection. Instead, the controller 182 analyzes the profile storage 184 in each device to determine whether there is a suitable match that warrants notification to the users of the respective wireless communication devices. In this aspect, system 100 functions as a wireless social network implemented on direct communication links between jump-enabled wireless communication devices. Conventional social networks are user-initiated. That is, the user must identify a potential contact and ask to be added to that person's "friends" list. In contrast, the system 100 is auto-initiated in that an initial contact is made automatically based on the determination of matching parameters from the profile storage 184.

FIG. 3 illustrates a form of personal data and preference data that may be stored in the profile storage 184. In one portion of the profile storage 184, the user of a wireless communication device 120 may enter personal data. As used herein, the personal data used to describe the individual owner of the wireless communication device is referred to as a "Jump In" data portion 190 of the profile storage 184 or simply referred to as Jump In data. The Jump In data can include any personal data regarding the user that the user wishes to make available to another jump-enabled wireless communication device. Jump In data may include, but is not limited to, Name, Sex, Age, Height, Weight, Status (e.g., relationship status), Work/Affiliation, Hobbies/Interests, e-mail address, Jump web page link, Phone Number, and the like. A Work/Affiliation may include job information for a professional as well as affiliation, such as a student at a particular school. In addition, affiliation may include, by way of example, religious affiliation or sports fan affiliation, such as a fan of a particular football or baseball team. Some information, such as an e-mail address and phone number may be optional.

Also illustrated in FIG. 3 is a table of preference data for relationships or contacts that the user of the wireless communication device 120 is seeking. The preference data is referred to herein as a "Jump Out" data portion 192 of the profile storage 184 or simply referred to as Jump Out data. Jump Out data may include, but is not limited to, Sex, Age, Height, Weight, Status, Work/Affiliation, Hobbies/Interests, and the like. Alternatively, a user may specify no preference at all.

In one embodiment, each of the wireless communication devices for which non-network wireless communication links have been established may exchange the Jump In data with other detected jump-enabled wireless communication devices. For example, when the wireless communication device 126 in FIG. 1 detects the presence of another jump-enabled wireless communication device (i.e., the wireless communication device 128), the non-network wireless communication link 138 is established. Once the non-network wireless communication link 138 is established, the wireless communication device 126 transmits its Jump In data to the wireless communication device 128. At substantially the same time, the wireless communication device 128 transmits its Jump In data to the wireless communication device 126. The controllers 182 in each of the respective wireless communication devices compare the received Jump In data with the Jump Out preference data stored in the respective profile storages 184. If the received Jump In data provides a suitable match to the Jump Out preference data for each of the wireless communication devices, the controllers 182 in the respective wireless communication devices generates a contact notification to the user of the wireless communication device.

In one embodiment, the wireless communication devices (e.g., the wireless communications devices 126-128 of FIG. 1) will only exchange Jump In data for data elements for which a Jump Out preference has been stated. For example, if the Jump Out preference data of one wireless communication device indicates no preference for age, height, or weight, the controller 182 may transmit the Jump In data minus the age, height, and weight. Those skilled in the art will appreciate that additional communications must be exchanged between the respective controllers 182 to initially establish which portions of Jump In data must be transmitted.

The contact notification may be in the form of data sent to the display 154 of each respective wireless communication device. In addition, the wireless communication device may provide an audio notification in the form of a beep or other tone. In yet another alternative embodiment, the controller 182 may cause the wireless communication device to vibrate as a form of notification if the user has placed the wireless communication device in a silent mode.

In an exemplary embodiment, the contact notification is generated only in the event that the controllers 182 in each of the respective wireless communication devices 126-128 find a suitable match between the received Jump In personal data and the Jump Out preference data. For example, the Jump In data transmitted from the wireless communication device 126 to the wireless communication device 128 may provide a suitable match to the Jump Out preference data stored in the profile storage 184 in the wireless communication device 128. This would provide a suitable match. However, if the Jump In personal data transmitted from the wireless communication device 128 to the wireless communication device 126 did not provide a suitable match to the Jump Out preference data in the profile storage 184 in the wireless communication device 126, neither wireless communication device would provide a contact notification to the user. In this embodiment, a secondary communication must occur between the wireless communication devices to indicate that each of the respective controllers 182 has determined that a match exists and that the contact notifications may be generated in each of the wireless devices.

Alternatively, the controller 182 and the wireless communication device 126 may provide a provisional contact notification to the user of the wireless communication device indicating that some match may have occurred, but indicating that not all preference data matched the received Jump In data. For example, the received Jump In data may match the Jump Out preference data in some categories, but does not match in the Work/Affiliation category. The controller 182 in the wireless communication device 126 may indicate the area of mismatch and allow the user the option of overriding the preference mismatch. In this event, contact notifications could be sent to the users of both wireless communication devices 126 and 128.

In yet another alternative, a contact notification may be provided to the users of both wireless communication devices (e.g., the wireless communication devices 126-128 of FIG. 1) even if there was a mismatch between the Jump In data and the Jump Out preference data in one or both of the wireless communication devices. This may provide the user of the wireless communication device the options of permitting the contact to proceed. It is well known that wireless communication devices may have programmable buttons near the display 154. Alternatively, the display 154 may be touch display that permits programmable buttons to be shown on the touch screen itself. The user may activate one of the programmable buttons to continue the contact or to terminate the contact. As noted above, a user may specify no preference at all in the Jump Out preference data. With the selection of this option, the wireless communication device can, in one embodiment, notify the user of any contact with another jump-enabled wireless communication device. Alternatively, a user that specifies no Jump Out preference data may only receive a contact notification if that user's Jump In data matches the Jump Out data of the jump-enabled wireless communication device with which a non-network communication link has been established.

In yet another embodiment, the users of both wireless communication devices may have no preference specified in the Jump Out preference data. In this case, the controller 182 in each wireless communication device may generate a contact notification as soon as the non-network wireless communication link has been established.

Those skilled in the art will appreciate that Jump In data and Jump Out data may be implemented in a flexible manner. For example, the user may prioritize or weight preference data in the Jump Out data such that some factors are more important than others. In yet another embodiment the weighting factors may be easily altered by the user. For example, the user may be attending an out-of-town sporting event. The user may alter the weighting factor for affiliation to identify only those nearby jump-enabled wireless communication devices that have the same sports affiliation (i.e., they are fans of the same team). As another example, a user may be attending a college homecoming football game and may wish to increase the weighting factor to identify college classmates either by graduate date, major, or a combination thereof. Thus, the user has great flexibility in entering Jump Out preference data to thereby selectively identify nearby jump-enabled devices whose users have the unique characteristics being searched for by the user. In this manner, the wireless communication device (e.g., the wireless communication device 120) functions as an auto-detecting social networking device that identifies nearby individuals whose characteristics match the preferences indicated by the user of the wireless communication device.

The discussion above describes the interaction between two jump-enabled wireless communication devices. However, the concept may be extended to multiple wireless communication devices. As illustrated in FIG. 1, the wireless communication device 122 is within range of the wireless communication devices 120 and 124. When the presence of the wireless communication devices 120 and 124 are detected by the wireless communication device 122, the non-network wireless communication links 134 and 136, respectively, are established. Once the non-network wireless communication links are established, each of the devices will transmit the Jump In data to the other detected jump-enabled wireless communication devices. In the example of FIG. 1, the wireless communication device 122 transmits its Jump In data to both the wireless communication device 120 and the wireless communication device 124. In turn, the wireless communication device 122 receives the Jump In data from the wireless communication device 120 and also receives the Jump In data from the wireless communication device 124. The controller 182 in the wireless communication device 122 performs an analysis on each of the received Jump In data sets for comparison with the Jump Out preference data stored in the profile storage 184 of the wireless communication device 122. Thus, the controller 182 may send multiple contact notices to the user if there are satisfactory matches between the multiple sets of Jump In data and the stored Jump Out preference data. Those skilled in the art can appreciate that this concept may be extended even further to a large number of jump-enabled wireless communication devices. The user may enter Jump In and Jump Out data into the profile storage 184 in a variety of different manners. A relatively simple application program running on the wireless communication device (e.g., the wireless communication device 120 of FIGS. 1-2) may allow the user to enter data via the keyboard 156. The application may also permit the user to arrange the order of preference in the Jump Out data or to declare that certain data elements (e.g., height and weight) have no preference.

In an alternative embodiment, the user may enter Jump In data and Jump Out preference data remotely. As illustrated in FIG. 1, a user may operate the user computer device 112 to enter Jump In and/or Jump Out data via the user computing device 112 and the network 110. The user-entered data is transmitted via the gateway 108 and, ultimately, via the base station 104 to the jump-enabled wireless communication device. In this embodiment, data for the profile storage 184 is provided via a network communication link and downloaded via the wireless communication network 102 to the jump-enabled wireless communication device.

The non-network wireless communication links are not intended to supplant communication via the wireless communication network 102. Those skilled in the art will appreciate that the non-wireless communication link may be transitory in nature because of the short communication range. The jump-enabled wireless communication device is intended to identify nearby contacts with which a person may share common interests. Thus, the jump-enabled communication device serves as a transitory detection and introduction technology, but does not replace normal voice communication, text messaging, photo sharing, video sharing, and the like, which occur through the wireless communication network 102. In typical operation, subsequent communication may take place face-to-face or through communication on the wireless communication network, such as email, text messaging, wireless telephone call, or the like.

Figure 4:
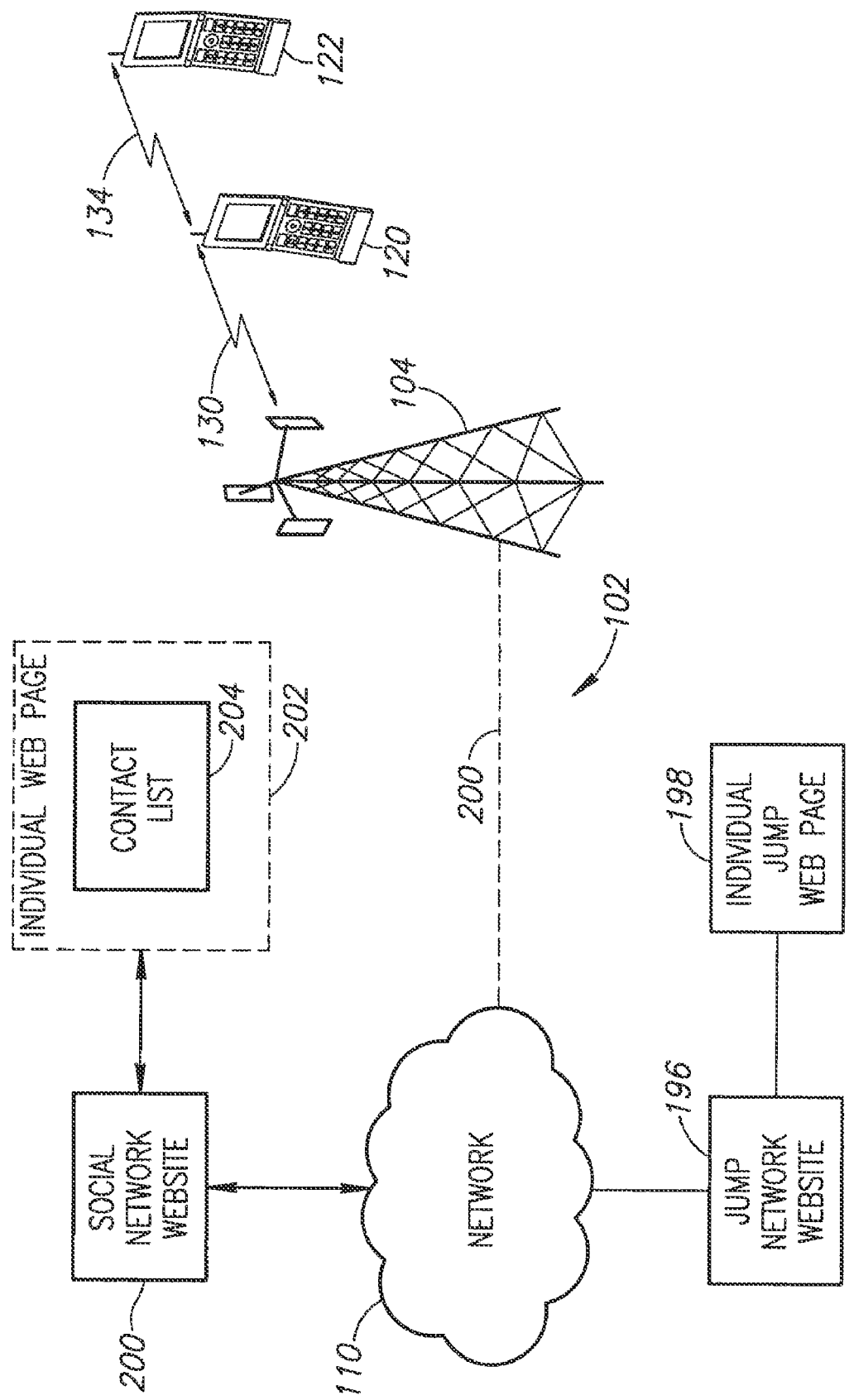
FIG. 4 illustrates an operational mode of the wireless communication device of FIG. 2.

The jump-enabled wireless communication device 120 also has numerous web-enabled applications. For example, an individual user may set up a jump website with information regarding that individual. In this aspect, the jump website may be similar to individual websites and any other conventional social network. The jump website may be accessed via the network 110 from the user computing device 112 (see FIG. 1). Alternatively, the jump website may be accessed by any web-enabled wireless communication device. For example, in FIG. 1, a non-network wireless communication link 134 has been established between the wireless communication devices 120 and 122. The wireless devices exchange the Jump In data, as described above, which is analyzed by the controller 182 (see FIG. 2). If a match occurs between the received Jump In data and the Jump Out data stored in the profile storage 184, the contact indicators are generated, as described above. Following an initial contact, the user of a wireless device (e.g., the wireless device 120) may use the web-browsing capability of the wireless communication device to access an individual jump web page for the individual with whom contact has just been made. This embodiment is illustrated in FIG. 4 where the wireless communication device 120 communicates with the base station 104 via the network wireless communication link 130. The wireless communication device 120 may use conventional web-browsing techniques to request access to a jump network website 196 via the network 110. Further, the wireless communication device 120 may request access to an individual jump web page 198 corresponding to the user of the wireless communication device 122. In an exemplary embodiment, initial data exchange between the wireless communication devices 120-122 via the non-network wireless communication link 134 may include a link to the individual jump web page 198. That is, if a match is determined by the controllers 182 in the respective wireless communication devices 120 and 122, the wireless communication device 120 may use the transmitted jump web page link to easily access the individual jump web page 198. Thus, the initial social contact made via the non-network wireless communication link 134 can readily provide additional information, in the form of a web link to allow the users of the wireless communication devices to gain further information via the wireless communication network 102. It should be noted that FIG. 4 illustrates a communication link 200 between the base station 104 and the network 110. This communication link 200, as a dashed line, is part of the wireless communication network 102 and includes a number of elements, such as the VSC 106 and Gateway 108 illustrated in FIG. 1. For the sake of clarity, the various network elements connecting the base station 104 with the network 110 are replaced merely by the communication link 200 in FIG. 4. In yet another aspect, the system 100 can utilize information from existing social networks. In a typical social network, each individual has a list of "friends" or "contacts" that are maintained for that individual. In one embodiment, a jump-enabled wireless communication device (e.g., the wireless communication device 120) may download the contact list for storage as part of the profile storage 184. This is also illustrated in FIG. 4 where a social network website 200 includes an individual web page 202. For that individual, a contact list 204 contains a list of all individuals that the owner of the individual web page 202 has identified as part of that individual's social network. In this aspect, the contact list 204 may be downloaded via the wireless communication network 102 to the wireless communication device 120 for storage in the profile storage 184.

In operation, the wireless communication device 120 searches for contacts in the manner described above. When a non-network wireless communication link (e.g., the non-network wireless communication link 134) is established, the Jump In data is exchanged between the wireless communication devices 120 and 122, in the manner described above. If the user of the wireless communication device 122 is already on the contact list 204 (now downloaded and stored in the profile storage 184), the wireless communication device 120 may immediately generate a contact notification to the user of the wireless communication device 120. In this embodiment, the controller 184 need not do a detailed comparison between the Jump In data received from the wireless communication device 122 and the store Jump Out preference data stored in the profile storage 184. Rather, the mere match between the user name of the wireless communication device 122 in the received Jump In data provides a match with the contact list 204 and the contact notification is generated. In another aspect of this embodiment, the wireless communication device 120 may transmit a web link to the individual web page 202 to enable the user of the wireless communication device 122 to gain additional information about the individual user of the wireless communication device 120. This may be in place of, or in addition to, an individual jump web page link, described above. Thus, system 100 allows seamless integration with existing social network websites as well as a jump network website.

The examples provided above extract data from the jump network website 196 or the social network website 200 and provide it to the wireless communication devices 120 and/or 122. However, the reverse process may also be implemented by the system 100. Following the determination that a match exists between the wireless communication devices 120-122, data, such as the Jump In data may be automatically extracted from the wireless communication device (e.g., the wireless communication device 120) and provided to the jump network website 196 and/or the social network website 200. For example, the user profile data from the wireless communication device 120 may be added to the contact list 204. Other profile information or other user-authorized information may also be used to populate the individual jump web page 198 and/or the individual web page 202. Thus, data stored within the wireless communication device may be extracted and used to populate data bases or other data storage structures.

FIG. 3 illustrates an example of typical Jump In data in the Jump In data portion 190 of the profile storage 184. In the embodiment described above, when a match notification is generated, the Jump In data transmitted by one wireless communication device (e.g. the wireless communication device 120 in FIG. 1) may be automatically extracted and sent to the individual jump web page 198 (see FIG. 4) for the user of the wireless communication device 122. Furthermore, any additional information authorized by the user of the wireless communication device 120 may be extracted upon generation of a match notification and sent to the individual jump web page 198 for the user of the wireless communication device 122. This may include information described above as optional Jump In personal data, such as an email address, telephone numbers, web page links, and the like. This automatic extraction process advantageously allows the user to automatically store information from contacts in the user's individual jump web page 198. At a subsequent time, the user may access his own individual jump web page to retrieve the stored information and to organize or further utilize the stored information. This may be particularly advantageous in a situation where the user of the wireless communication device 120 makes a number of contacts in a short period of time. While the wireless communication device 120 may store the Jump In data from multiple contacts, the automatic extraction and storage process described herein allows the data to automatically be extracted and forwarded to the user's individual jump web page for future use. Those skilled in the art will appreciate that the automatic data extraction and storage may also be performed on the individual web page 202 (see FIG. 4) associated with the social network website 200.

Figure 5:
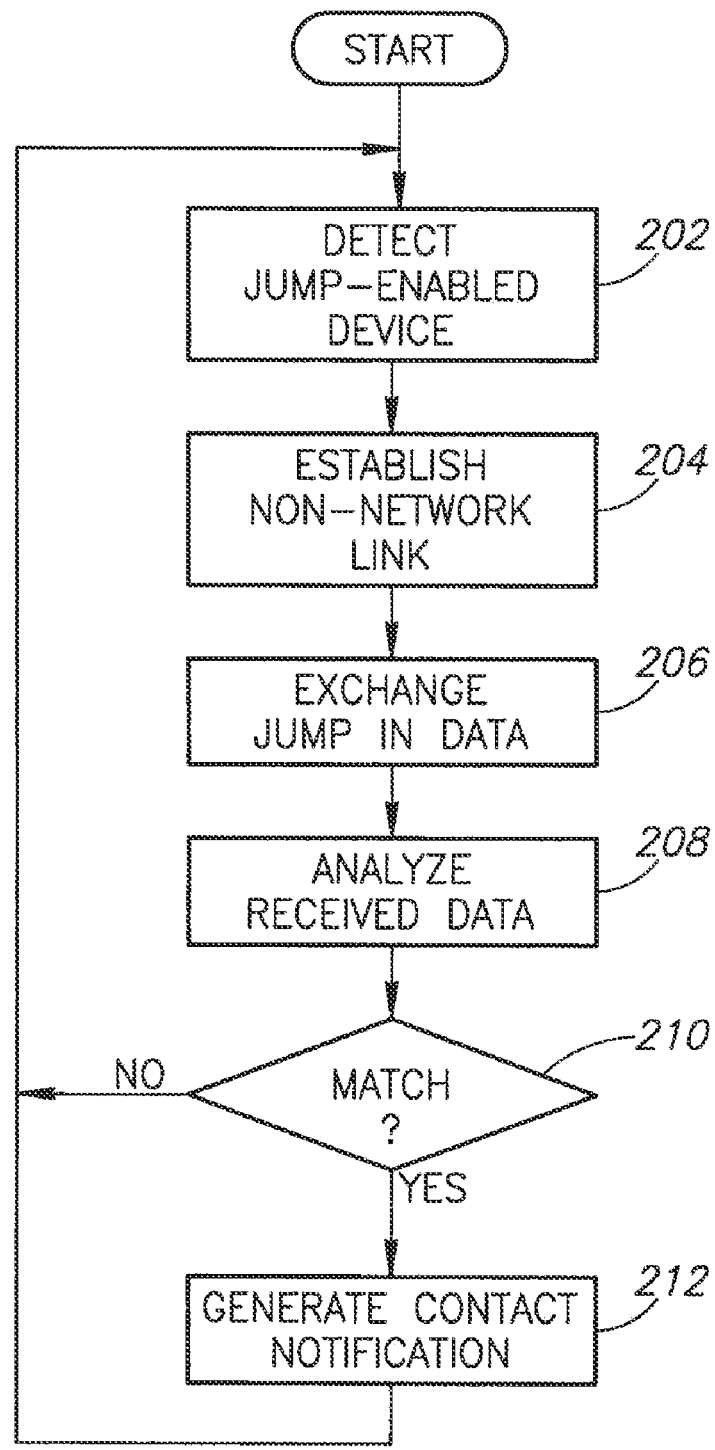
FIG. 5 is a flow chart illustrating the operation of the wireless communication devices of FIG. 1.

The operation of the system 100 is illustrated in the flow chart of FIG. 5 where a jump-enabled wireless communication device detects the proximity of another jump-enabled wireless communication device in step 202. A technique for peer-to-peer communication has already been described with respect to IEEE 802.11. Other peer-to-peer technologies may also be satisfactory to implement the non-network wireless communication links. The system 100 is not limited by the specific form of technology used to implement the non-network wireless communication links. In addition, the wireless communication device (e.g., the wireless communication device 120) may include a user selective enablement of a jump-mode. In this manner, the user can control when the wireless communication device is jump-enabled. In step 204, the wireless communication device 120 establishes a non-network wireless communication link with another jump-enabled wireless communication device. Once the non-network wireless communication link has been established, the two jump-enabled wireless communication devices exchange the Jump In data portions of the respective profile storage 184 in step 206. There are a number of alternative techniques for exchanging information, as previously described. This may include, for example, the total exchange of all data stored in the Jump In data 190 or may include the transmission only of portions of the Jump In data 190 that correspond to portions of the Jump Out data for which a user has specified a preference.

In step 208, the controller of each wireless communication device analyzes the received Jump In data with respect to the Jump Out preference data 192 stored in the profile storage 184. A variety of different analysis techniques have been discussed above, including, for example, importance of various factors, the weighting of different factors, and the like. In one embodiment, the user may specify the importance of various factors merely by the sequence in which the preferences are arranged. In an alternative embodiment, the user may assign various importance levels to various factors. For example, the most important factors may be identified by a numeral "1" while a second tier of importance may be identified by a numeral "2." Various other matching algorithms may be used. The system 100 is not limited by the specific preference factors, or by the manner in which the preference factors are analyzed.

If there is a match between the received Jump In data and the stored Jump Out preference data, a match occurs in decision 210 and, in step 212, the wireless communication device generates a contact notification. As discussed above, the contact notification can occur based on individual analysis, or may be restricted to a situation in which both wireless communication devices have determined that a match exists. Various other techniques for determining whether a contact notification should be generated have been described above. If the controller determines that a match has not occurred, the result of decision 210 is NO. In that event, or following the generation of the contact notification in step 212, the system returns to step 202 to detect additional jump-enabled wireless communication devices.

Figure 6:
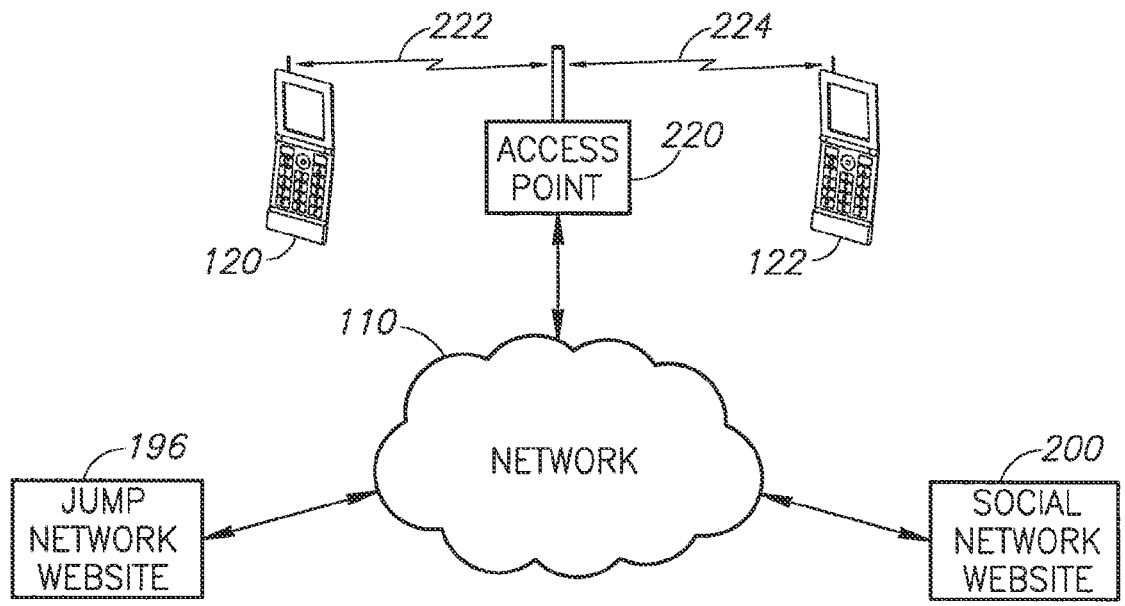
FIG. 6 is a diagram illustrating a system architecture configured to implement a communication system in an alternative embodiment.

In yet another alternative embodiment, the jump-enabled wireless communication devices (e.g., the wireless communication devices 120-122) may communicate with an access point 220, such as a Wi-Fi base station, illustrated in FIG. 6. FIG. 6 illustrates a wireless communication link 222 established between the access point 220 and the wireless communication device 120. Similarly, the wireless communication device 122 establishes a wireless communication link 224 with the access point 220. The access point 220 is coupled to the network 110 in a conventional manner. This can include a wired or wireless connection directly to the network 110 or via an intermediate network gateway, such as those provided by an Internet Service Provider (ISP). The access point 220 may access the jump network website 196 or the social network website 200 via the network 110, as described above.

Figure 7:
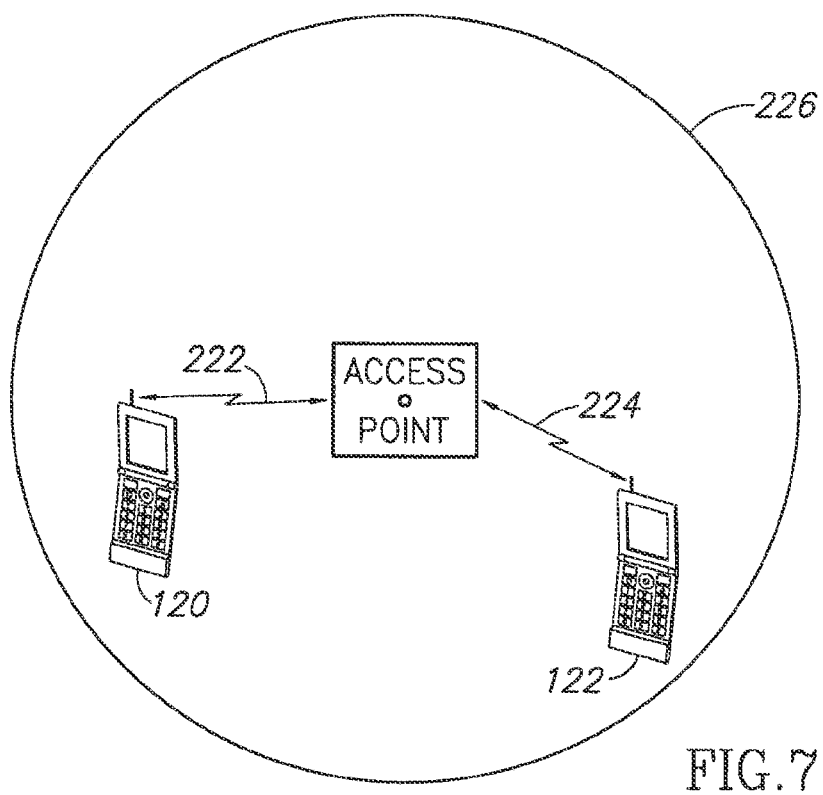
FIG. 7 illustrates an area of coverage provided by an access point in FIG. 6.

FIG. 7 illustrates an area of coverage 226 for the access point 220. In an exemplary embodiment, the wireless communication devices 120-122 are both within the area of coverage 226.

The access point 220 may have a range of a mile or more. However, a common implementation of the access point 220 is a short range "hot spot" often provided by retailers for the convenience of its customers. For example, a coffee shop or bookstore may provide a hot spot that its customers may use. Although the example illustrated herein refers to a "Wi-Fi" base station, the base station 220 illustrated in the embodiment of FIG. 6 may be thought of as an access point to a network, such as the Internet. While such access points may be typically implemented as a Wi-Fi base station, other technologies (e.g., WiMAX, 3G/4G or long term evolution LTE) may be used to implement the base station 220. Thus, the access point provided by the base station 220 may be implemented by a variety of different communication technologies and is not limited to Wi-Fi technology.

In the embodiment illustrated in FIG. 6, the non-network transceiver 176 (see FIG. 2) may be implemented using conventional technology capable of providing wireless communication with the access point 220. Implementation of such short range communication with a Wi-Fi hot spot may often be accomplished using Bluetooth technology. This communication technology is well known in the art, and need not be described in greater detail herein. Other communication protocols, such as IEEE 802.11, are also possible. The system described herein is not limited by the specific communication protocol used to establish the wireless communication links 222-224 between the access point 220 and the wireless communication devices 120-122, respectively.

Figure 8:
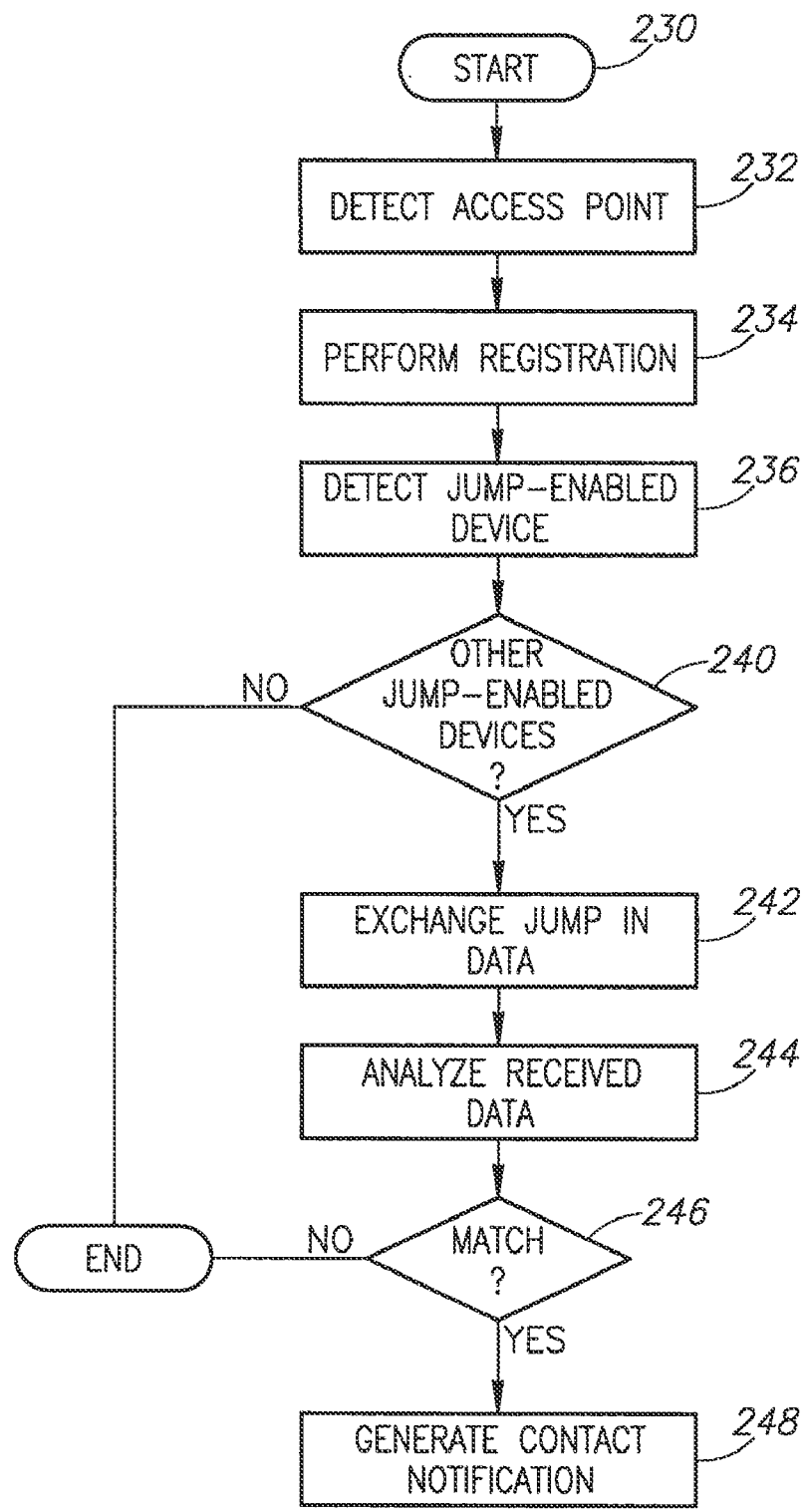
FIG. 8 is a flow chart illustrating the operation of the wireless communication devices of FIG. 6.

The operation of the wireless communication devices 120-122 with the access point 220 is illustrated in the flowchart of FIG. 8. At a start 230, the access point 220 is operational. For purposes of the following discussion, it is assumed that the wireless communication device 120 has already performed a registration operation with the access point 220. At step 232, the wireless communication device 122 comes within the area of coverage 226 (see FIG. 7) of the access point 220 and thereby detects the access point. In step 234, the wireless communication device performs a registration operation with the access point 220. In some embodiments, an access point may be unrestricted. That is, any user coming within the area of coverage 226, may use the access point 220 without requiring a user name and password as part of the registration process. In other implementations, a user name and/or password may be required as part of the registration process. For example, some retail facilities may allow unrestricted access while others may require a purchase and provide a temporary user name and password.

In step 236, the access point 220 detects that the wireless communication device 122 is a jump-enabled device. This process may be performed as part of the registration in step 234 or performed upon completion of the registration.

In decision 240, the access point 220 determines whether other jump-enabled devices are also registered. If no other jump-enabled wireless communication devices are currently registered with the access point 220, the result of decision 240 is NO and the process illustrated in FIG. 8 essentially ends until other jump-enabled devices register with the access point 220.

If other jump-enabled devices are registered with the access point 220, the result of decision 240 is YES. In step 242, the Jump In data is exchanged between the jump-enabled wireless communication devices. In the example illustrated in FIG. 6, the wireless communication devices 120-122 would exchange Jump In data. The Jump In data, which has been previously described, may be exchanged in a variety of alternative techniques. In one embodiment, the access point receives Jump In data from a wireless communication device as part of the registration process, or upon completion of the registration process when the device is determined to be a jump-enabled device (in step 236). In this embodiment, the access point 220 temporarily stores Jump In data for all jump-enabled wireless communication devices registered therewith. When a new jump-enabled wireless communication device registers with the access point 220, its Jump In data is also delivered to the access point 220 for distribution to other jump-enabled wireless communication devices already registered with the access point 220. In turn, the access point 220 also delivers Jump In data for one or more previously registered jump-enabled wireless communication devices to the newly registered wireless communication device (e.g., the wireless communication device 122). Alternatively, the access point 220 simply stores registration information indicating the registration of one or more jump-enabled wireless communication devices. When a new jump-enabled wireless communication device registers with the access point 220, the access point provides a notification to each of the registered jump-enabled wireless communication devices. In this embodiment, the wireless communication devices 120-122 exchange Jump In data with each other via the access point 220. That is, the wireless communication device 120 transmits its Jump In data to the access point 220 to be relayed to the jump-enabled wireless communication device 122. Similarly, the wireless communication device 122 transmits its Jump In data to the access point 220 to be relayed to the jump-enabled wireless communication device 120.

In step 244, wireless communication devices 120-122 analyze the received Jump In data with respect to its own stored Jump Out data in step 244. The analysis of Jump In and Jump Out data has already been discussed in detail above.

In decision 246, the wireless communication device 122 determines whether there is a match between its own stored Jump Out data and the Jump In data received from the wireless communication device 120. If no match exists, the result of decision 246 is NO and the process ends. If a match exists, the result of decision 246 is YES and, in step 248, the wireless communication device 122 generates a contact notification.

As previously discussed, there are a number of alternative control mechanisms with respect to match determination and contact notification. For example, while the wireless communication device 122 analyses the Jump In data received from the wireless communication device 120 (in step 244), the wireless communication device 120 is performing the same operation. That is, the wireless communication device 120 analyses its own stored Jump Out data with respect to the Jump In data received from the wireless communication device 122. Thus, the wireless communication devices 120 and 122 are both performing steps 244-246 at substantially the same time. In one embodiment, the contact notification may be sent by either device in the event of a match in decision 246. In another embodiment, contact notification is generated only is both devices generate a match as a result of the analysis in step 244.

In one embodiment, the wireless communication devices 120-122 follow essentially the same process illustrated in the flow chart of FIG. 8. That is, the wireless communication devices 120-122 exchange Jump In data in step 242 and analyze the received data in step 244. The analysis in step 244 may be performed by each respective wireless communication device to determine, in decision 246, whether there is a match between the received Jump In data from the other wireless communication device and the stored Jump Out data stored within each respective wireless communication device. If a match occurs, the wireless communication devices 120-122 may generate a contact notification in step 248.

The contact notification may also be relayed between the wireless communication devices 120-122 by the access point 220. Further communication between the wireless communication devices 120-122 may occur via the access point 220. Alternatively, the wireless communication devices 120-122 may establish a communication link via the network transceiver 166 (see FIG. 2) in each wireless device. In yet another alternative, further communication between the wireless communication devices 120-122 may occur via web applications. For example, the wireless communication devices 120-122 may access the jump network website 196 or the social network website 200 via the network 110. The user of one jump-enabled wireless communication device may be authorized by the user of another jump-enabled wireless communication device to view a user profile or personal webpage, such as the individual jump webpage 198 or the individual webpage 202 illustrated in FIG. 4. While the wireless communication devices are within the coverage area 226 (see FIG. 7) access to the network 110 may be achieved via the access point 220. Thus, the access point 220 may serve as an initial portal to establish communications between jump-enabled wireless communication devices.

As previously described, information may be extracted from the jump network website 196 or the social network website 200 and provided to the wireless communication devices once it has been determined that a match exists. Alternatively, further authorization may be required prior to the retrieval of data from the jump network website 196 or the social network website 200. As also discussed above, data from the wireless communication devices 120-122 may be extracted and used to provide information to the jump network website 196 and/or the social network website 200. Once a match has been established, data, such as user profile data, may be extracted from the wireless communication devices 120-122 and provided to the jump network website 196 and/or the social network website 200. Alternatively, further authorization beyond a match determination may also be required.

In this embodiment, Jump In data (see FIG. 3) and/or any other user-authorized data may be automatically extracted from the wireless communication device and transmitted, via the access point 220 to the individual jump web page 198, illustrated in FIG. 4. This may include data described above as optional Jump In personal data, such as email addresses, telephone numbers, web page links, and the like. This data is automatically extracted from the wireless communication device (e.g., the wireless communication device 122 in FIG. 6) and stored in the individual jump web page 198 associated with the user of the wireless communication device 120. At a subsequent time, the user may access his own individual jump web page to retrieve the stored data to organize or further use the stored information. This automatic process advantageously allows the user to collect Jump In data from a number of contacts and automatically have the information extracted and used to populate a data storage area on the individual's web page. In one embodiment, the data may be extracted from known data fields, such as those fields defined in the Jump In data portion 190 of FIG. 3. In this situation, the data may be used to automatically populate data storage locations or cells in a database, spreadsheet, data table, or any other convenient data structure. The precise form of the data structure is not critical to satisfactory implementation of the data extraction and storage process.

Figure 9:
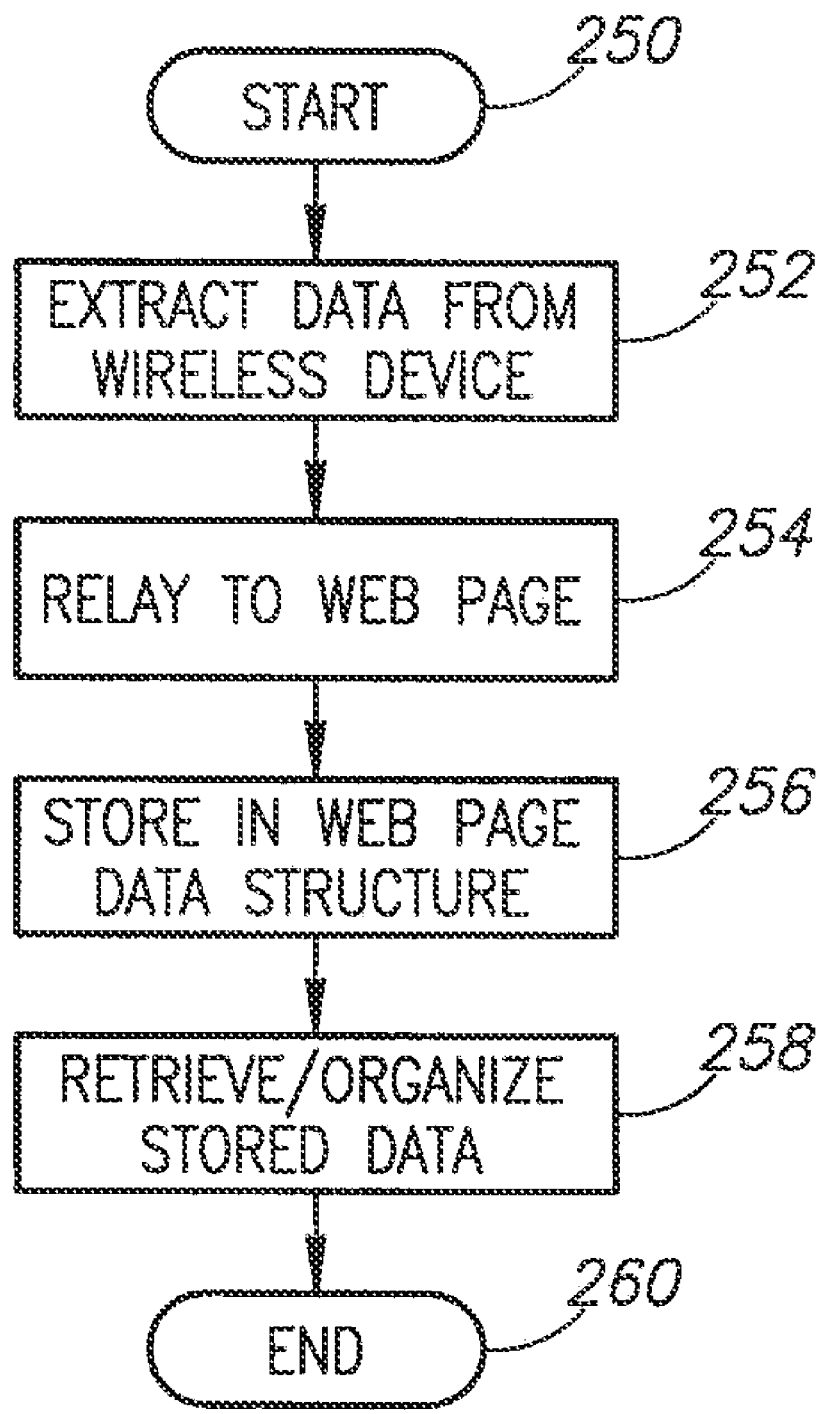
FIG. 9 is a flow chart illustrating the operation of the wireless communication devices in FIG. 6 to automatically extract information and store it in association with a user-controlled web page.

The extraction and storage process is illustrated in the flow chart of FIG. 9. At a start 250 the wireless communication devices (e.g., the wireless communication devices 120 and 122 of FIG. 6) are active and have registered with the access point 220 in the manner described above. In step 252, data is extracted from, by way of example, the wireless communication device 122. In one embodiment, data may be extracted only upon generation of the contact notification (see FIG. 8) or upon alternative user authorization. The data may be extracted by the wireless communication device 120 or extracted directed directly by the access point 220. A similar process may be performed with respect to data extracted from the wireless communication device 120. That is, the wireless communication device 122 or the access point 220 may extract information from the wireless communication device 120.

In step 254, the extracted data is relayed to the respective individual jump web pages 198. That is, the data extracted from the wireless communication device 122 is relayed to the web page associated with the user of the wireless communication device 120. In turn, the information extracted from the wireless communication device 120 is relayed to the individual web page of the user of the wireless communication device 122.

In step 256, the server associated with the jump network web site 196 stores the received data in the individual jump web page 198. As noted above, the data may be stored in any convenient manner using any convenient form of a data structure. In many embodiments, the storage area associated with the individual jump web page 198 may be provided by the server hosting the jump network website 196. In this embodiment, the data storage structure is associated with the individual jump web page 198. In an alternative embodiment, the individual jump web page 198 may include its own server and the data storage structure may be part of the server that supports the individual jump web page 198. Those skilled in the art will appreciate that other network architectures may be satisfactorily employed to provide the jump network website 196, the individual jump web page 198, and the data storage structure associated with the individual jump web page.

In step 258, the user may, at a subsequent time, retrieve the stored data for organizational purposes or for further use. As discussed above, when data is extracted from known data fields, it can be used to automatically populate specified data fields in the data structure associated with the individual jump web page 198. In other circumstances, the data may be extracted from previously undefined data fields. In this embodiment, the extracted data may be stored in a general purpose data field within the data structure associated with the individual jump web page 198. In step 258, the user may organize the data by placing extracted data into appropriately labeled data fields. For example, email addresses and telephone numbers may be stored in appropriate labeled data fields within the data structure associated with the individual web page 198. In addition, the user may retrieve the stored data in step 258 for other purposes, such as initiating a contact with the individual whose data has been extracted. This contact may take the form of a telephone call, email, text message, link to the other individual's web page, or the like. The process ends at 260.

Thus, the system 100 may automatically extract data and populate a data structure in an individual's web page for future use. While the above process has been described with respect to the embodiment of FIG. 6, those skilled in the art will appreciate its applicability to the system illustrated in FIGS. 1-5. In addition, the process illustrated in FIG. 9 may be used to automatically populate the individual web page 202 at the social network web site 200.

In the embodiment described above, the access point 220 simply stores a list of jump-enabled wireless communication devices currently registered with the access point. As other jump-enabled wireless communication devices register with the access point 220, the access point sends notifications to any previously registered jump-enabled wireless communication devices as a notification that other jump-enabled wireless communication devices are also registered.

In an alternative embodiment, the access point 220 may receive both Jump In data and Jump Out data from each registered wireless communication device. In this embodiment, the Jump In and Jump Out data is stored in association with registration information (e.g., a temporary network address) for each respective wireless communication device. The access point 220 may perform the analysis of Jump In and Jump Out data from each respective wireless communication device (in step 242 of FIG. 8) to determine whether a match exists. If a match exists, the access point 220 sends separate notifications to the wireless communication devices whose data provides a match. In this embodiment, the access point 220 receives and temporarily stores the Jump In and Jump Out data from each wireless communication device. When the communication link between the wireless communication device and the access point 220 is broken, the access point 220 will delete any Jump In and/or Jump Out data temporarily stored by the access point. The communication link may be broken by active termination by the user or if the wireless communication device simply moves out of the area of coverage 226 (see FIG. 7) of the access point 220. Alternatively, the access point 220 may store the Jump In and/or Jump Out data for some time period after the wireless communication link has been broken. For example, the access point 220 may store the Jump In and/or Jump Out data for several seconds (e.g., 60 seconds) to avoid having to retransmit such data if the wireless communication link is temporarily broken due to a transient condition. In yet another alternative embodiment, the access point 220 may retain the Jump In and/or Jump Out data for a longer period of time so that a frequent customer need not retransmit such data each time the customer re-registers with the access point 220. Caching of such data and cache management, are well known in the art and need not be described in greater detail herein.

In yet another embodiment, the access point 220 may access the network 110 (e.g., the Internet) to retrieve Jump In data and/or Jump Out data for a newly-registered wireless communication device. A user profile, including the Jump In data and/or Jump Out data can be stored at a remote location, such as a computer server associated with the jump network website 196, the social network website 200, or the wireless communication service provider. When a wireless communication device (e.g., the wireless communication device 122) registers with the access point 220, the registration information may be used to retrieve the Jump In and/or Jump Out data from the remote location. Conventional security technology may be applied to prevent unauthorized retrieval of user profile information (i.e., Jump In and/or Jump Out data). This may include requesting user permission and/or user entry of a password or security code. Other forms of security, such as identification of the authenticity of the mobile phone number associated with the wireless communication device may also be used. Transmission of passwords and/or other security data may be encrypted to prevent its unauthorized interception. In this embodiment, the Jump In and Jump Out data is transmitted from the remote location (e.g., the jump network website 196) to the access point 220 and is analyzed by the access point 220 in the manner described above.

In yet another alternative, the access point 220 may pass registration data for the wireless communication devices 120-122 to a central location (e.g., the jump network website 196) in the manner described above. In this embodiment, the server hosting the jump network website 196 can retrieve the Jump In and Jump Out data for each registered wireless communication device and perform the analysis at the server location. In this embodiment, the Jump In and Jump Out data for each registered wireless communication device is retrieved, but is not transmitted to the access point 220. This may provide greater security by maintaining the Jump In and Jump Out data in a secure location associated with the server. The server performs the data analysis step (i.e., steps 244-246) for each of the wireless communication devices and provides a result to the access point 220. If a match has occurred, the access point 220 is instructed to generate the contact notification in the manner described above and transmit it to the wireless communication devices whose Jump In and Jump Out data have produced a match. As discussed above, subsequent communication between the wireless communication devices 120-122 may occur via the access point 220 or may occur over the network using the network transceiver 166 in each of the wireless communication devices.

In the embodiments described above, the access point 220 receives registration information from the jump-enabled wireless communication devices 120-122. Data provided by the wireless communication devices 120-122 during registration or just following registration identifies these devices as jump-enabled devices. In yet another alternative embodiment, the access point 220 may transmit an indicator that one or more jump-enabled wireless communication devices are registered therewith. For security purposes, the access point 220 does not transmit any information directly linked with registered jump-enabled wireless communication devices. The access point 220 simply transmits data indicating that there are jump-enabled wireless communication devices registered with the access point 220. In this embodiment, an unregistered jump-enabled wireless communication device may come within range of the access point 220. The unregistered wireless communication device (e.g., the wireless communication device 120) receives a message indicating that one or more other jump-enabled wireless communication devices (e.g., the wireless communication device 120) are registered with the access point 220. In essence, the access point 220 is offering to register the wireless communication device 120 in order to provide the jump-enabled communication link described above.

Thus, jump-enabled wireless communication devices may communicate directly with each other and exchange Jump In data, as described above, or may communicate indirectly via an access point (e.g., the access point 220). Using the access point 220 as an intermediate node provides additional alternative implementations as described above.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for processing data from a wireless communication device, comprising:
    means for storing user-related data in a storage location of a first wireless communication device;
    means for establishing a wireless communication link between the first wireless communication device and a second wireless communication device wherein the means for establishing the wireless communication link comprises direct communication between the first and second wireless communication devices using a transceiver in each of the first and second wireless communication devices or by using the respective transceivers in the first and second wireless communication devices to communicate via a wireless access point with the first and second wireless communication devices both communicating directly with the wireless access point;
    means for extracting the user-related data in the storage location of the first wireless communication device upon establishment of the wireless communication link;
    means for transferring the extracted user-related data to a web page associated with a user of the second wireless communication device;
    means for storing the transferred data in a storage location associated with the web page; and
    means for accessing the web page to retrieve the stored transferred data.

2. A method for processing data from a wireless communication device, comprising:
    storing user-related data in a storage location of a first wireless communication device;
    establishing a wireless communication link between the first wireless communication device and a second wireless communication device wherein the wireless communication link between the first wireless communication device and a second wireless communication device is established by direct communication between transceivers in the first and second wireless communication devices, respectively;
    upon establishment of the wireless communication link between the first wireless communication device and the second wireless communication device, extracting the user-related data in the storage location of the first wireless communication device;
    transferring the extracted user-related data to a web page associated with a user of the second wireless communication device; and
    storing the transferred data in a storage location associated with the web page.

3. The method of claim 2 wherein the transceivers are short-range transceivers.

4. The method of claim 2 wherein the transceivers are non-network transceivers.

5. The method of claim 2, further comprising:
    upon establishment of the wireless communication link between the first wireless communication device and the second wireless communication device, providing at least a portion of the user-related data from the storage location of the first wireless communication device to the second wireless communication device; and
    analyzing the portion of the portion of the user-related data with respect to preference data specified by a user of the second wireless communication device to determine a match between the portion of the user-related data and the user-specified preference data.

6. The method of claim 5 wherein extracting the user-related data in the storage location of the first wireless communication device is permitted only upon determination of a match between the portion of the user-related data and the user-specified preference data.

7. The method of claim 2 wherein the second wireless communication device stores user-related data in a storage location of the second wireless communication device, the method further comprising:
    upon establishment of the wireless communication link between the first wireless communication device and the second wireless communication device, providing at least a portion of the user-related data from the storage location of the second wireless communication device to the first wireless communication device; and
    analyzing the portion of the portion of the user-related data with respect to preference data specified by a user of the first wireless communication device to determine a match between the portion of the user-related data and the user-specified preference data.

8. The method of claim 7 wherein extracting the user-related data in the storage location of the second wireless communication device is permitted only upon determination of a match between the portion of the user-related data and the user-specified preference data.

9. The method of claim 2 wherein extracting the user-related data in the storage location of the first wireless communication device is performed by the first wireless communication device in response to a request for data received from the second wireless communication device and transmitted from the first wireless communication device to the second wireless communication device via the wireless communication link.

10. The method of claim 2 wherein extracting the user-related data in the storage location of the first wireless communication device is performed by the first wireless communication device in response to a request for data received from a wireless network access point and transmitted from the first wireless communication device to the wireless network access point via a wireless communication link between the first wireless communication device and the wireless network access point.

11. The method of claim 2 wherein transferring the extracted user-related data to the web page associated with a user of the second wireless communication device is performed using a wireless network access point.

12. The method of claim 2, further comprising:
   storing user-related data in a storage location of a third wireless communication device;
   establishing a wireless communication link between the second wireless communication device and the third wireless communication device;
   upon establishment of the wireless communication link between the second wireless communication device and the third wireless communication device, extracting the user-related data in a storage location of the third wireless communication device;
   transferring the extracted user-related data to the web page associated with the user of the second wireless communication device; and
   storing the transferred data in the storage location associated with the web page.

13. The method of claim 2, further comprising accessing the web page to retrieve the stored transferred data.

14. The method of claim 2 wherein transferring the extracted user-related data to the web page associated with the user of the second wireless communication device is performed by establishing a network connection with a wireless service provider network using a wide-area network transceiver within the second wireless communication device.

15. A method for processing data from a wireless communication device, comprising:
   storing user-related data in a storage location of a first wireless communication device;
   establishing a wireless communication link between the first wireless communication device and a second wireless communication device wherein the wireless communication link between the first wireless communication device and a second wireless communication device is established by a first communication link between a transceiver in the first wireless communication device and a wireless network access point and a second communication link between a transceiver in the second wireless communication device and the wireless network access point;
   upon establishment of the wireless communication link between the first wireless communication device and the second wireless communication device, extracting the user-related data in the storage location of the first wireless communication device;
   transferring the extracted user-related data to a web page associated with a user of the second wireless communication device; and
   storing the transferred data in a storage location associated with the web page.

16. The method of claim 15 wherein extracting the user-related data in the storage location of the first wireless communication device is performed by the first wireless communication device in response to a request for data received from the second wireless communication device and transmitted from the first wireless communication device to the second wireless communication device via the wireless communication link.

17. The method of claim 15 wherein extracting the user-related data in the storage location of the first wireless communication device is performed by the first wireless communication device in response to a request for data received from a wireless network access point and transmitted from the first wireless communication device to the a wireless network access point via a wireless communication link between the first wireless communication device and the wireless network access point.

18. The method of claim 15 wherein transferring the extracted user-related data to the web page associated with the user of the second wireless communication device is performed using the wireless network access point.

19. The method of claim 15 wherein transferring the extracted user-related data to the web page associated with the user of the second wireless communication device is performed by establishing a network connection with a wireless service provider network using a wide-area network transceiver within the second wireless communication device.

20. The method of claim 15, further comprising:
   storing user-related data in a storage location of a third wireless communication device;
   establishing a wireless communication link between the second wireless communication device and the third wireless communication device;
   upon establishment of the wireless communication link between the second wireless communication device and the third wireless communication device, extracting the user-related data in a storage location of the third wireless communication device;
   transferring the extracted user-related data to the web page associated with the user of the second wireless communication device; and
   storing the transferred data in the storage location associated with the web page.

21. The method of claim 15, further comprising accessing the web page to retrieve the stored transferred data.

22. A system for processing data from a wireless communication device, comprising:
   a first wireless communication device having:
      a transceiver;
      a storage area configured to store user-related data related to a user of the first wireless communication device; and
      a controller configured to control operation of the first wireless communication device;
   a second wireless communication device having:
      a transceiver; and
      a controller configured to control operation of the second wireless communication device;
   wherein the respective controllers in the first and second wireless communication devices are configured to establish a wireless communication link directly between the first and second wireless communication devices using the respective transceivers;
   upon establishment of the wireless communication link between the first wireless communication device and the second wireless communication device, extracting the user-related data from the storage location of the first wireless communication device; and
   transferring the extracted user-related data to a web page associated with a user of the second wireless communication device.

23. The system of claim 22 wherein the transceivers in the first and second wireless communication devices are short-range transceivers.

24. The system of claim 22 wherein the transceivers in the first and second wireless communication devices are non-network transceivers.

25. The system of claim 22 wherein the controller in the first wireless communication device is configured to provide at least a portion of the user-related data from the storage location of the first wireless communication device to the second wireless communication device via the communication link; and wherein the controller in the second wireless communication device is configured to analyze the portion of the user-related data with respect to preference data specified by a user of the second wireless communication device to determine a match between the portion of the user-related data and the user-specified preference data.

26. The system of claim 25 wherein extracting the user-related data in the storage location of the first wireless communication device is permitted only upon determination of a match between the portion of the user-related data and the user-specified preference data.

27. The system of claim 22, further comprising:
a storage area in the second wireless communication device configured to store user-related data related to a user of the first wireless communication device;
wherein the controller in the second wireless communication device is configured to provide at least a portion of the user-related data from the storage location of the second wireless communication device to the first wireless communication device via the communication link; and wherein the controller in the first wireless communication device is configured to analyze the portion of the user-related data with respect to preference data specified by a user of the first wireless communication device to determine a match between the portion of the user-related data and the user-specified preference data.

28. The system of claim 27 wherein extracting the user-related data in the storage location of the second wireless communication device is permitted only upon determination of a match between the portion of the user-related data and the user-specified preference data.

29. The system of claim 22 wherein the controller in the second wireless communication device is further configured to establish a communication link with a wireless access point using the transceiver in the second wireless communication device and to transfer the extracted user-related data to the web page associated with the user of the second wireless communication device using the wireless network access point.

30. The system of claim 22, further comprising a wide-area network transceiver within the second wireless communication device wherein the controller in the second wireless communication device is further configured to establish a communication link with a wireless service provider network using the wide-area network transceiver within the second wireless communication device and to transfer the extracted user-related data to the web page associated with the user of the second wireless communication device using the network connection with the wireless service provider network.

31. A system for processing data from a wireless communication device, comprising:
a wireless access point;
a first wireless communication device having:
a transceiver;
a storage area configured to store user-related data related to a user of the first wireless communication device; and
a controller configured to control operation of the first wireless communication device;
a second wireless communication device having:
a transceiver; and
a controller configured to control operation of the second wireless communication device;
wherein the respective controllers in the first and second wireless communication devices are configured to establish a wireless communication link between the first and second wireless communication devices with the controller in the first wireless communication device configured to establish a first communication link between the first wireless communication device and the wireless access point using the transceiver in the first wireless communication device and the controller in the second wireless communication device configured to establish a second communication link between the second wireless communication device and the wireless access point using the transceiver in the second wireless communication device;
upon establishment of the wireless communication link between the first wireless communication device and the second wireless communication device, extracting the user-related data from the storage location of the first wireless communication device; and
transferring the extracted user-related data to a web page associated with a user of the second wireless communication device.

32. The system of claim 31 wherein the controller in the second wireless communication device is further configured to establish a communication link with the wireless access point using the transceiver in the second wireless communication device and to transfer the extracted user-related data to the web page associated with the user of the second wireless communication device using the wireless network access point.

33. The system of claim 31, further comprising a wide-area network transceiver within the second wireless communication device wherein the controller in the second wireless communication device is further configured to establish a communication link with a wireless service provider network using the wide-area network transceiver within the second wireless communication device and to transfer the extracted user-related data to the web page associated with the user of the second wireless communication device using the network connection with the wireless service provider network.

* * * * *